UNITED STATES PATENT OFFICE.

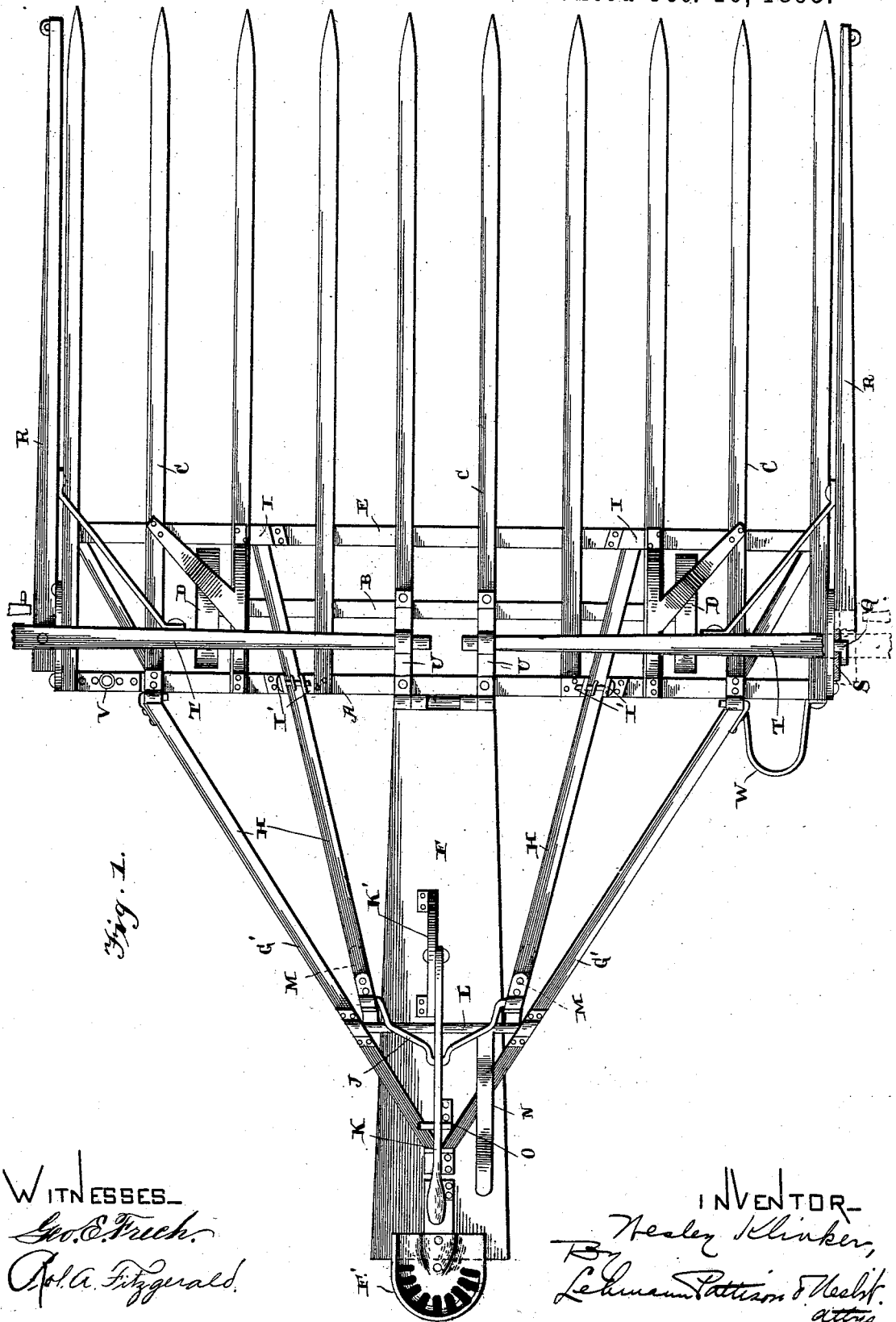

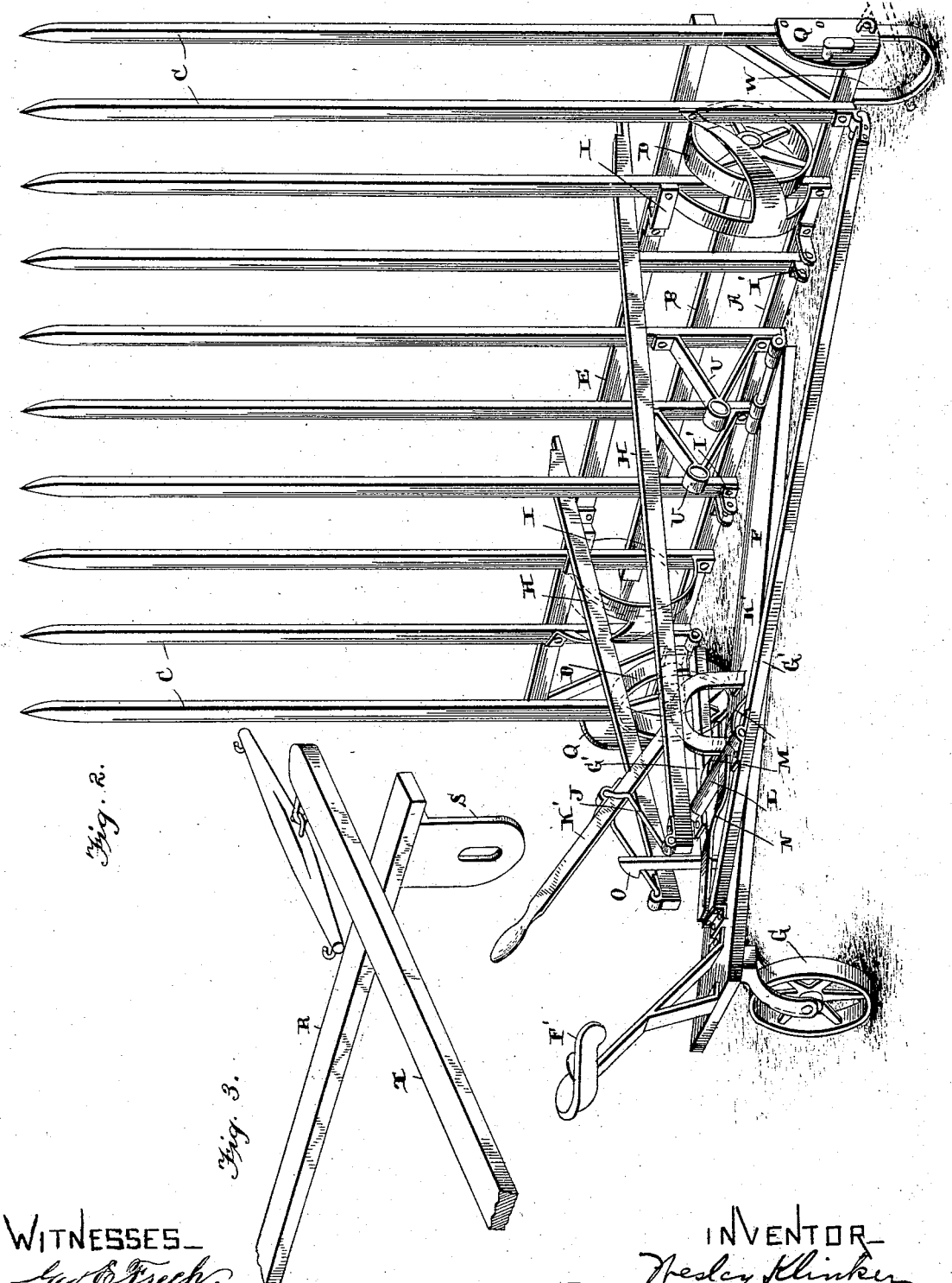

WESLEY KLINKER, OF UNION MILLS, IOWA.

RAKE.

SPECIFICATION forming part of Letters Patent No. 506,597, dated October 10, 1893.

Application filed November 7, 1892. Serial No. 451,216. (No model.)

*To all whom it may concern:*

Be it known that I, WESLEY KLINKER, of Union Mills, in the county of Mahaska and State of Iowa, have invented certain new and useful Improvements in Rakes; and I do hereby declare the following to be a full, clear, and exact description of the invention, such as will enable others skilled in the art to which it pertains to make and use it, reference being had to the accompanying drawings, which form part of this specification.

My invention relates to an improvement in rakes; and it consists in the novel combination and arrangement of parts which will be fully described hereinafter, and more particularly referred to in the claims hereto annexed.

The object of my invention is to construct an improved rake of the "drag" type which is very simple in operation and which is capable of being folded in such a way as to render its transportation through gates and fence gaps an easy operation.

Referring to the accompanying drawings,—Figure 1 is a plan view of my improved machine. Fig. 2 is a perspective view of the same, showing the teeth raised in position to move from one field to another. Fig. 3 is a detail view of one of the poles R and arm T.

A, designates a bar to which the rear ends of the teeth C, are secured and B, a second bar parallel with and in front of the bar A, and at the ends of this bar B, the wheels D, are journaled which support the rake while in an operative position.

E, represents a third bar extending across the rake teeth in front of the wheels D.

F, designates a platform which has a hinge connection at its forward end with the bar A, as shown. Beneath the rear end of the platform is the caster G, and supported by said end is the seat F'. Extending from the rear portion of the platform to the respective ends of the bar A, are the braces G'. Extending rearward across the bars A, and E, are the converging arms H, the same being held to the bar E, at their forward ends by the loops I, and to the bar A, by the brackets I' in which they are secured. The rear ends of these arms H, are loosely secured to the depending ends of the yoke J. The loop portion of this yoke is secured to a lever K, which is fulcrumed at its lower end to a bracket K', projecting from the platform F. By drawing backward this lever a downward pressure is exerted on the bars H, thus raising their forward ends from the ground. This operation is effected when the teeth have become loaded.

Journaled across the rear ends of the platform F, and braces G', is the shaft L, having forwardly projecting arms M, which extend beneath the ends of the arms H, and also the rearwardly extending treadle N, so that by depressing the latter by the foot of the operator the ends of the arms H, are raised and the teeth points forced down to the ground for gathering the hay. A notched vertical standard O, is provided for the lever K, as shown. Projecting from the opposite ends of the tooth frame are the bearings Q, and supported thereon are the forwardly extending poles R, by means of the depending perforated brackets S, at their rear ends which work on the bearings Q. Extending inward across the rear ends of the poles R, are the arms T, which are held at their inner ends by the loops U, which project from the tooth frame. To the outer ends of these arms T, the horses are attached with their heads hitched to the forward ends of the poles R, as will be readily understood.

The bearings Q, have rearwardly extending hooks on their outer ends as shown so that the said ends are elongated. The openings in the brackets S, are also elongated as shown, but the elongations extend vertically so that when the brackets are to be placed on the bearings it is necessary to turn the poles R, into a vertical position so that the same may be moved onto the bearings over the hooks above described. Thus a secure fastening is formed for the poles R, which renders it impossible for them to become detached as long as their horizontal position is retained.

When the rake is to be moved from one field or place to another the outer ends of the arms H, are detached from the tooth frame as shown in Fig. 2, and the latter turned to a vertical position. The poles R, are removed and may be carried on the rake frame conveniently. For supporting the tooth frame when in this position one of the wheels D, is removed from its axle and mounted on a hub V, which projects vertically from the top of the frame when the latter extends horizontally but which when the same is turned up extends horizontally rearward. One end of the frame is thus supported and for the opposite end a sliding shoe W, is provided and to the end of the frame supported by the shoe the horse is attached for moving the rake to the desired point.

Having thus fully described my invention, I claim—

1. In a horse rake, the combination of a platform, the toothed frame hinged thereto, a frame rigid with the tooth frame and extending over said platform, a lever to depress the rear end of said frame and thereby raise the tooth frame, link loosely connecting said lever to said frame extending over the platform and mechanism, separate and independent of said lever substantially as shown, to raise the rear end of said frame and thereby depress the tooth frame, substantially as shown and described.

2. In a horse rake, the combination, of a platform, the tooth frame hinged thereto, a frame rigid with the tooth frame and extending over the platform, a lever fulcrumed on the platform and loosely connected to the end of said frame, and a rock shaft having a lateral arm to engage the rear end of said frame, substantially as shown and described.

3. In a horse rake, the combination of a platform, the toothed frame hinged thereto and having the sockets I and I', the frame H removably secured to the tooth frame by said sockets and extending rearwardly over the platform, a lever fulcrumed to the platform and loosely joined to the rear end of frame H, and means for raising the rear end of said frame.

4. In a horse rake, the combination of the wheeled toothed frame having the elevated bearing U at its center, and the vertical plates Q at its ends having the brackets, poles having depending plates S with holes to receive said brackets and with inwardly extending arms fitted in said bearings U at their inner ends, substantially as shown and described.

In testimony whereof I affix my signature in presence of two witnesses.

WESLEY KLINKER.

Witnesses:
DUDLY A. JAMES,
G. W. PFOUTZ.